(12) United States Patent
Gharapetian

(10) Patent No.: US 7,877,588 B2
(45) Date of Patent: Jan. 25, 2011

(54) SYSTEM FOR TRANSMITTING CONTROL COMMANDS TO ELECTRONIC DEVICES

(75) Inventor: Ara H. Gharapetian, Porter Ranch, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 896 days.

(21) Appl. No.: 10/037,208

(22) Filed: Jan. 4, 2002

(65) Prior Publication Data

US 2002/0101357 A1    Aug. 1, 2002

Related U.S. Application Data

(60) Provisional application No. 60/260,138, filed on Jan. 5, 2001.

(51) Int. Cl.
G06F 9/24 (2006.01)
H04B 10/04 (2006.01)

(52) U.S. Cl. .............. 713/1; 713/100; 398/112; 341/174

(58) Field of Classification Search .......... 713/1, 713/100; 341/173, 174, 176; 398/106, 107, 398/111, 112; 348/734
See application file for complete search history.

(56) References Cited

U.S. PATENT DOCUMENTS

| | | | |
|---|---|---|---|
| 4,760,572 A | 7/1988 | Tomikawa ............... 370/94 |
| 4,850,040 A * | 7/1989 | Teich et al. ............. 398/112 |
| 5,255,313 A | 10/1993 | Darbee | |
| 5,552,917 A | 9/1996 | Darbee et al. ........... 359/148 |
| 5,831,663 A | 11/1998 | Waterhouse et al. ......... 348/8 |
| 5,905,906 A | 5/1999 | Goffinet et al. .......... 395/828 |
| 6,104,334 A | 8/2000 | Allport | |
| 6,211,870 B1 * | 4/2001 | Foster ................... 715/744 |
| 6,225,938 B1 * | 5/2001 | Hayes et al. ............ 341/176 |
| 6,507,306 B1 * | 1/2003 | Griesau et al. .......... 341/176 |

* cited by examiner

Primary Examiner—Thuan N Du

(57) ABSTRACT

This invention provides a remote control capable of automatically sending signals to a variety of electronic devices so that a user does not have to send signals to each of the electronic devices individually. The remote control may include a dedicated button that when activated may send signals to a plurality of electronic devices to perform one or more operations. The remote control may send the signals simultaneously or sequentially. The signals may be also encoded with the specific address for each of the plurality of electronic devices. This way, only the electronic device with the matching address may receive the signal. The signals may be also encoded with any number of commands such as turn "on" or turn "off" so that each electronic device may perform a similar or different operation as other electronic devices. The remote control may be any type of device that may be distinct from the electronic device such as a hand-held device. The electronic devices may be any type of electronic device that may be controlled remotely either through a hardwire or wirelessly.

19 Claims, 5 Drawing Sheets

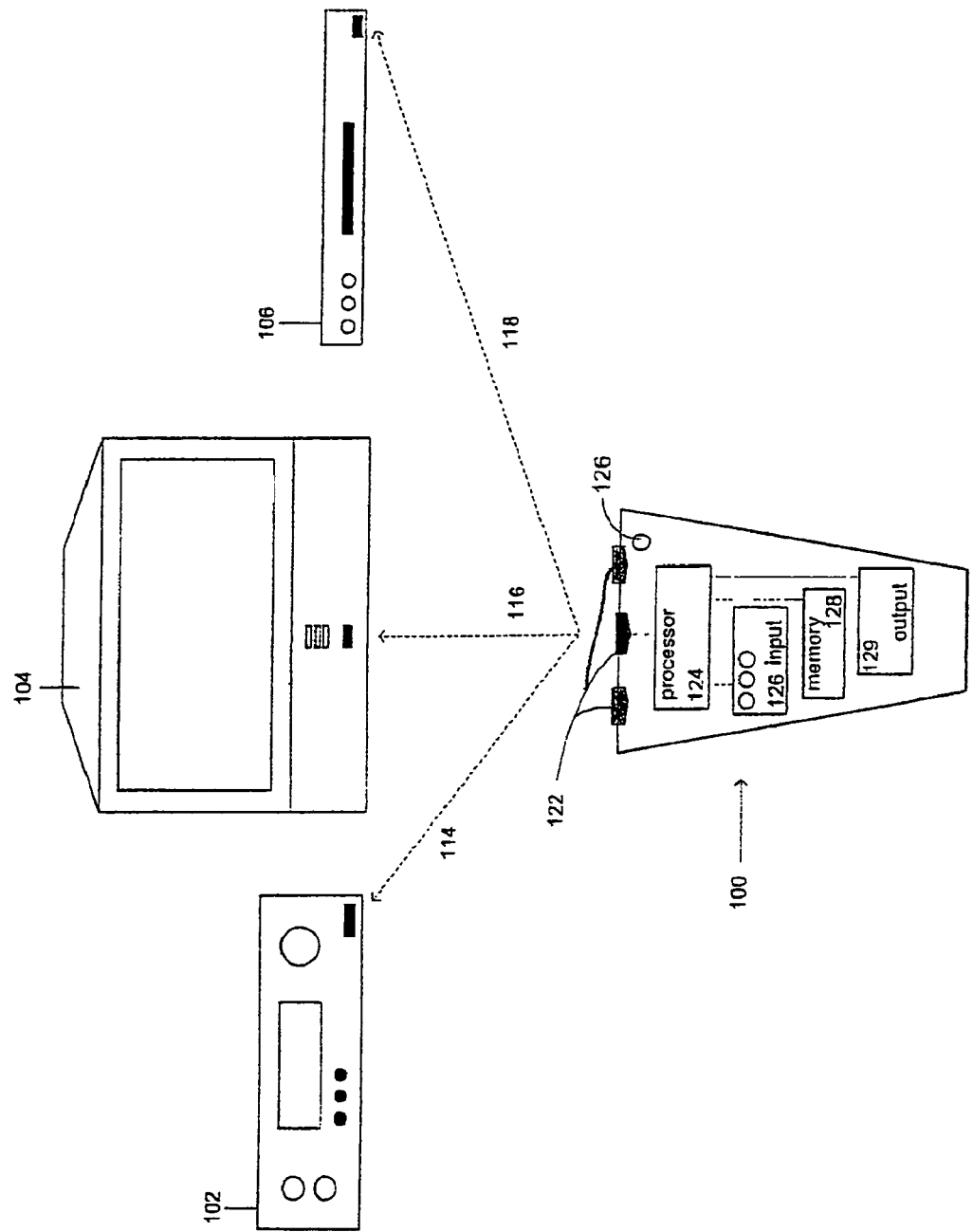

SYSTEM FOR TRANSMITTING CONTROL COMMANDS TO ELECTRONIC DEVICES

RELATED APPLICATION

This application claims priority to U.S. provisional application No. 60/260,138, entitled "One Click Remote Control," filed Jan. 5, 2001, and is incorporated by reference.

BACKGROUND OF THE INVENTION

1. Field of the Invention

This invention provides a remote control device capable of automatically controlling and setting functions in a variety of electronic devices.

2. Related Art

Remote controls are used for transmitting signals to one or more electronic devices. The signals are encoded with specific information for instructing a particular electronic device to perform an operation. Signals are encoded with an address and a command. The address encoded in the signal identifies a particular electronic device, and the command directs that electronic device to perform an operation. This way, an electronic device with the matching address is able to receive the signal and process the command in the signal. The command may instruct an electronic device to turn "on" or "off," change the volume "up" or "down," for example.

Consumers may select from a host of electronic devices such as audio and visual equipments designed for homes, offices, and studios. For example, a home theatre system may include a Video Tape Recorder/player, DVD Recorder/player, CD Recorder/player, Hard-disk Recorder/player, Solid-state-memory recorder/player, tape player, equalizer, radio tuner, radio receiver, amplifier, television, satellite radio, cable radio, computer system, internet access set-top box, cable box, satellite box, control boxes for room lighting, control boxes for curtains, control box for security systems, or any other remotely controlled devices. Each electronic device may be provided with a remote control programmed with the address and a number of commands for that particular electronic device.

For convenience, one universal remote control may be used to control many electronic devices. A universal remote control may allow a user to send signals to a number of electronic devices, even made of different brands. However, a universal remote control may not send signals to multiple electronic devices automatically, either simultaneously or sequentially. Instead, a user manually sends a signal to each of the electronic devices one at a time. For example, to turn "on" a TV and a VCR, a user selects the "TV" mode in the universal remote and presses the "on" button, then selects the "VCR" mode and may press the same "on" button. Manually sending the signals to each of the electronic devices individually takes time and effort, and can be cumbersome. Therefore, there is a need for a remote control capable of sending signals to a variety of electronic devices automatically.

SUMMARY

This invention provides a remote control capable of automatically sending signals to a variety of electronic devices so that a user does not have to send signals to each of the electronic devices individually. The remote control may include a dedicated button that when activated may send signals to a plurality of electronic devices to perform one or more operations. The remote control may send the signals simultaneously or sequentially. The signals may also be encoded with the specific address for each of the plurality of electronic devices. This way, only the electronic device with the matching address may receive the signal. The signals may be also encoded with any number of commands such as turn "on" or turn "off" so that each electronic device may perform a similar or different operation as other electronic devices. The remote control may be any type of device that may be distinct from the electronic device such as a hand-held device. The electronic devices may be any type of electronic device that may be controlled remotely either through a hardwire or wirelessly. For example, electronic devices may be a Video Tape Recorder/player, DVD Recorder/player, CD Recorder/player, Hard-disk Recorder/player, Solid-state-memory recorder/player, tape player, equalizer, radio tuner, radio receiver, amplifier, television, satellite radio, cable radio, computer system, internet access set-top box, cable box, satellite box, control boxes for room lighting, control boxes for curtains, control box for security systems, or any other remotely controlled device.

The remote control may include an electromagnetic transmitter/receiver capable of transmitting signals such as infrared signals or radio frequency signals. The remote control may also include a processor capable of directing the transmitter to send the signals to the electronic devices. An input device may be incorporated into the remote control, such as a button, a touch sensitive screen, and a numeric key-pad so that a user may activate the input device to run a pre-programmed algorithm to automatically send the signals to a number of electronic devices. For example, a user may initiate a dedicated button on the remote control that may automatically turn "on" a plurality of the electronic devices simultaneously or successively. The microprocessor may encode into the signals an appropriate address for the plurality of electronic devices along with a turn "on" command. The microprocessor may then communicate with the transmitter to send the signals with the address and a command to the plurality of electronic devices. The user may then initiate the dedicated button again to turn "off" the plurality of electronic devices in a similar manner.

Other systems, methods, features and advantages of the invention will be or will become apparent to one with skill in the art upon examination of the following Figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following Figures. The devices in the Figures are not necessarily to scale, emphasis instead being placed upon illustrating the principles of the invention. Moreover, in the Figures, like reference numerals designate corresponding parts throughout the different views.

DETAILED DESCRIPTION OF THE PREFERRED EMBODIMENTS

Figure 1:
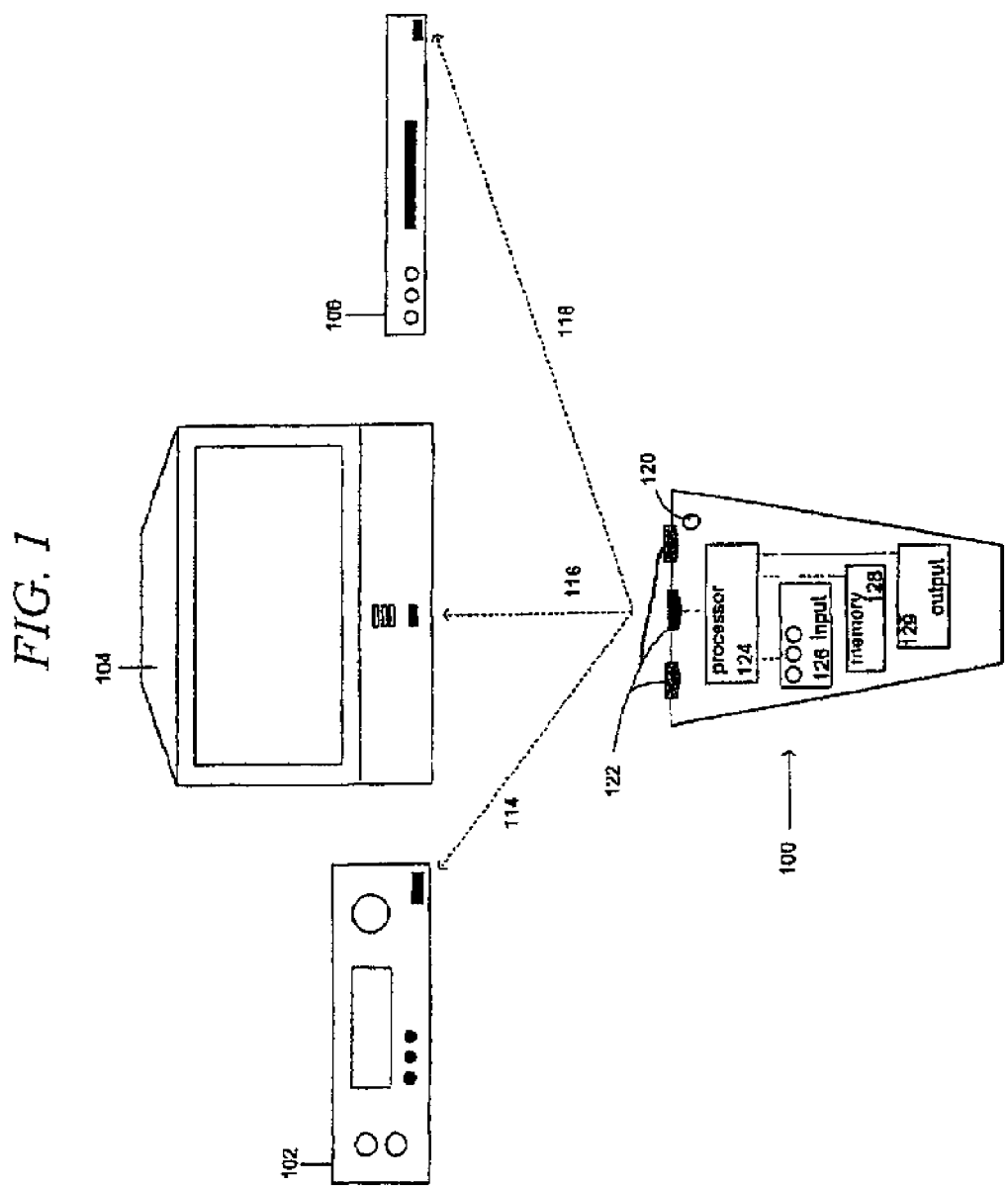
FIG. 1 is a block diagram illustrating a remote control controlling a number of electronic devices.

FIG. 1 illustrates a remote control 100 capable of sending signals automatically to more than one electronic device so that a user does not have to manually select and control each of the electronic devices individually. Once the remote control 100 is activated the signals may be automatically sent simultaneously and/or sequentially to a plurality of electronic devices. For example, once the remote control 100 is activated, it may turn "on" an amplifier 102, TV 104, and DVD player 106, automatically by sending "on" signals 114, 116, and 118 to the amplifier 102, TV 104, and DVD player 106, respectively. The remote control 100 may automatically send the signals 114, 116, and 118 simultaneously and/or sequentially to each of the electronic devices 102, 104, and 106. The signal 114 may be encoded with the address that matches the address of the amplifier 102 and a command to turn "on" the amplifier 102. The signal 116 may be encoded with the address that matches the address of the TV 104 and a command to turn "on" the TV 104. The signal 118 may be encoded with the address that matches the address of the DVD player 106 and a command to turn "on" the DVD player 106. This way, only the electronic device that recognizes the address in the signal may receive the signal and perform the command encoded in the signal. A variety of commands may be encoded into the signals such as a command to turn "up" the contrast on the TV 104, "play" the DVD 106, and turn "up" the volume on the amplifier 102.

The remote control 100 may include a processor 124 able to communicate with a memory 128. The memory 128 may be pre-programmed with the appropriate addresses for a number of different electronic devices made by different manufactures. An input instrument 126 may also be incorporated into the remote control 100 so that a user may input new address codes for electronic devices not pre-programmed in the memory 128. The remote control 100 may also "learn" the address codes from a remote control that was provided with the electronic device. The microprocessor 124 may then use the address codes in the memory 128 to encode the address to a particular electronic device into a signal with a command.

The remote control 100 may also include an initiation device 120 that when activated initiates the processor 124 to automatically transmit the signals to a number of electronic devices. The initiation device 120 may be a mechanical button, a touch sensitive LCD screen, or any type of input device known in the art. For example, the input device 120 may be a button dedicated to turning "on" or "off" the power for a number of electronic devices. Once a user initiates the process using the input device 120, the microprocessor 124 may look up the appropriate "turn-on" command code for each of the electronic devices 102, 104, 106 and encode them into a signal or sequence of signals. The microprocessor 124 may then direct the signal to a transmitter 122 capable of transmitting the signal to the electronic devices 102, 104, and 106, respectively. Also, there may be more than one initiation device 120 on the remote control 100 where each initiation device 120 may perform a distinct task. For example, one dedicated button may turn "off" and another dedicated button may turn "on" the power to the same number of electronic devices.

The signals may be transmitted simultaneously and/or successively. The processor 124 may send the signal through the transmitter 122 successively by sending the signals one at a time to each of the electronic devices. The processor 124 may also send the signals simultaneously by using multiple transmitters 122. The transmitter 122 may be any type of transmitter that sends signals from one location to another either wirelessly or through a hardwire such as an electromagnetic transmitter or a hardwire transmitter. The user may then activate the initiation device 120 again to turn "off" all of the electronic devices 102, 104 and 106 with a turn "off" command encoded in a signal for each of the electronic devices.

Besides automatically turning all of the devices "on" or "off," the remote control 100 may be used to set up both audio and visual electronic devices to satisfy a particular format such as the THX™ format. Audio setup commands may include power, volume, frequency response, and frequency bandwidth settings. Visual setup commands may include power, white level, color, brightness, sharpness, and/or tint. The remote control 100 may also have an output device 129 to inform the user of a variety of information such as the signals being sent to the electronic devices and its status. The output device may be a LED or a LCD screen, an indicating light, a speaker, or any other type output device that communicates with the user.

Figure 2:
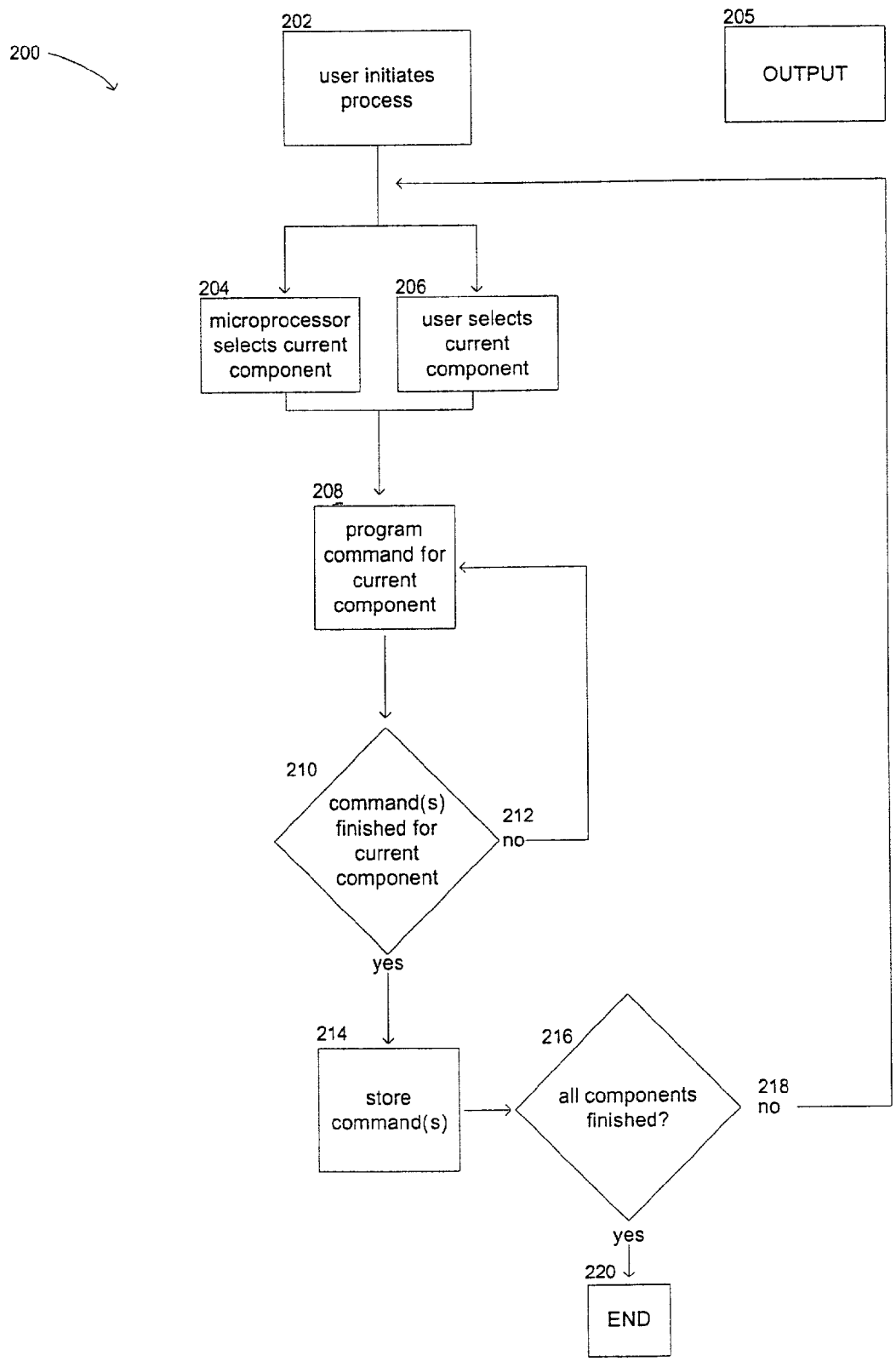
FIG. 2 is a flow chart illustrating the input of programming commands or macros for a number of electronic devices.

FIG. 2 illustrates a process 200 for programming and storing command sequences that may be sent to a number of electronic devices. Command sequences, or "macros" may be a sequence of commands that instruct an electronic device to perform a variety of operations. For example, a macro may be programmed to turn "on" an amplifier and then set the "volume" of the amplifier to a desired level.

A user may initiate 202 the process 200 through an initiation button 120 in the remote control 100. The microprocessor 124 in the remote control 100 may run the process and cycle through a number of different devices. The processor may select an electronic device 204 for programming a command or macro. Alternatively, a user may manually select 206 a particular device for programming. Once an electronic device is selected either through 204 or 206, a command may be programmed 208 for the electronic device. If the user wants to program multiple commands, this process may be repeated 212. If the user is finished with programming a command or a macro for the electronic device, the command or macro may be stored 214 in the memory 128 of the remote control 100. This process may be repeated 216, 218, until all of the desired devices are programmed. The process 200 may end 220 after the programming is done.

Figure 3:
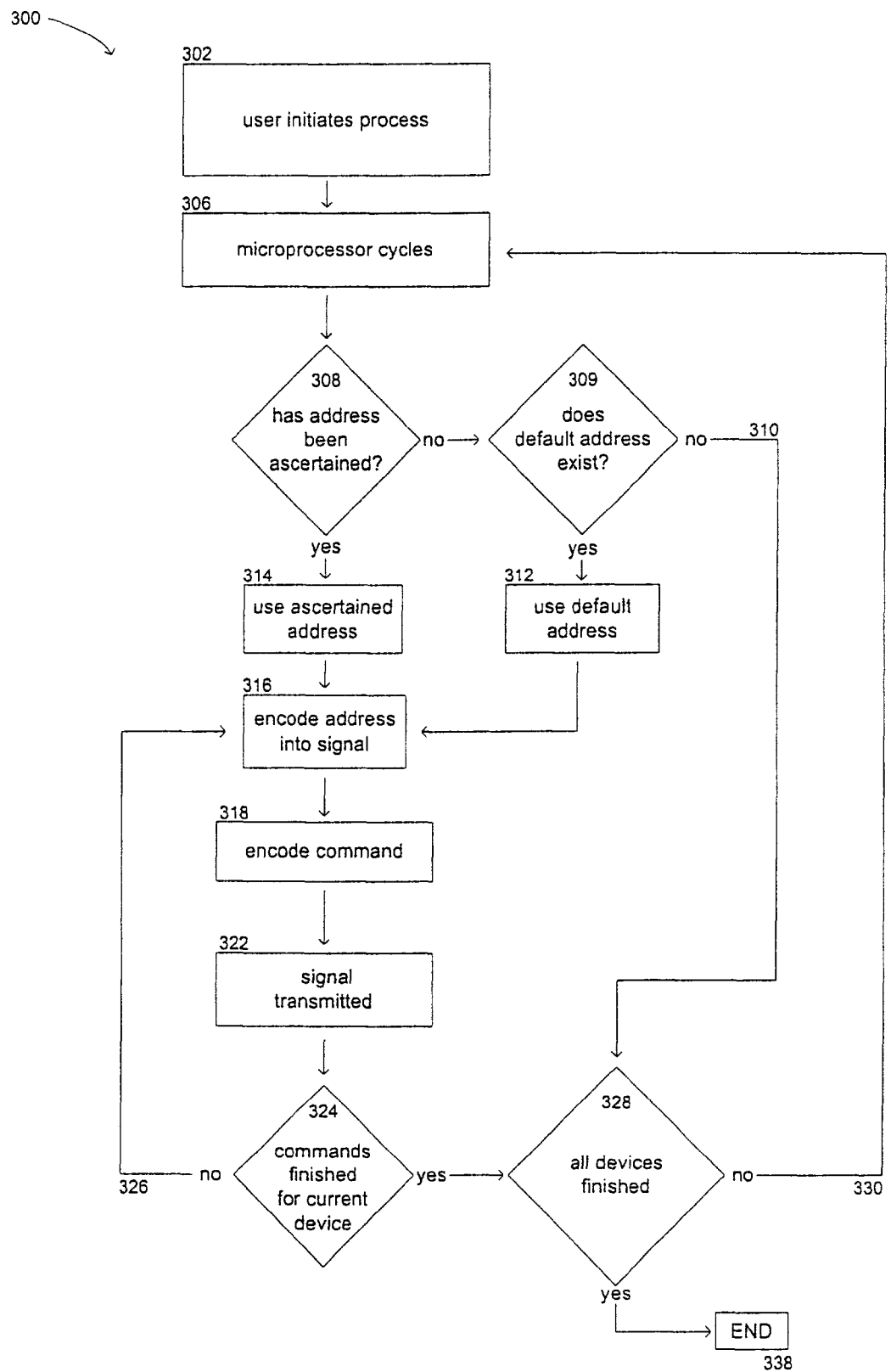
FIG. 3 is a flow chart illustrating the encoding of a signal with an address and a command for an electronic device.

FIG. 3 illustrates a process 300 for automatically sending encoded signals with appropriate addresses and commands to a number of electronic devices. A variety of commands may be encoded into the signal such as turning "on" or "off" the electronic devices, setting the volume, or "playing" an audio/visual file. A user may initiate 302 the process 300 through an initiation button 120 in the remote control 100. The microprocessor may then cycle through each of the electronic devices that are to be controlled and determines if a specific address has been ascertained (as shown in FIG. 2) for that electronic device 308. If so, the microprocessor may use the ascertained address 314 to encode the address into the signal 316. If not, the microprocessor may use a default address for the electronic device and encode the default address into the signal 312. Alternatively, the microprocessor may choose to ignore that specific device if there is no code available 310.

If an address has been determined for a particular device through step 314 or step 312, a command may be encoded into a signal 318. The signal may be transmitted 322 through the transmitter in the remote control. If a macro is being programmed, this process may repeat 326 itself until all of the commands are encoded into signals for each of the electronic devices. Once all of the commands are finished for the current device, the microprocessor 124 may check to determine 328 if rest of the electronic devices have been cycled through the process 328. If not, the process may be repeated 330.

The signal transmission may be done through a variety of methods, such as infrared or radio frequency (electromagnetic), hard-wired dedicated, hard-wired multiplexed, hard-wired network, and wireless (RF or IR) network. For convenience, a status of the process may be outputted to the user anytime during the process 300. For example, the output device 129 on the remote control 100 may include a button that illuminates, indicating that a signal has been issued to an electronic device.

Figure 4:
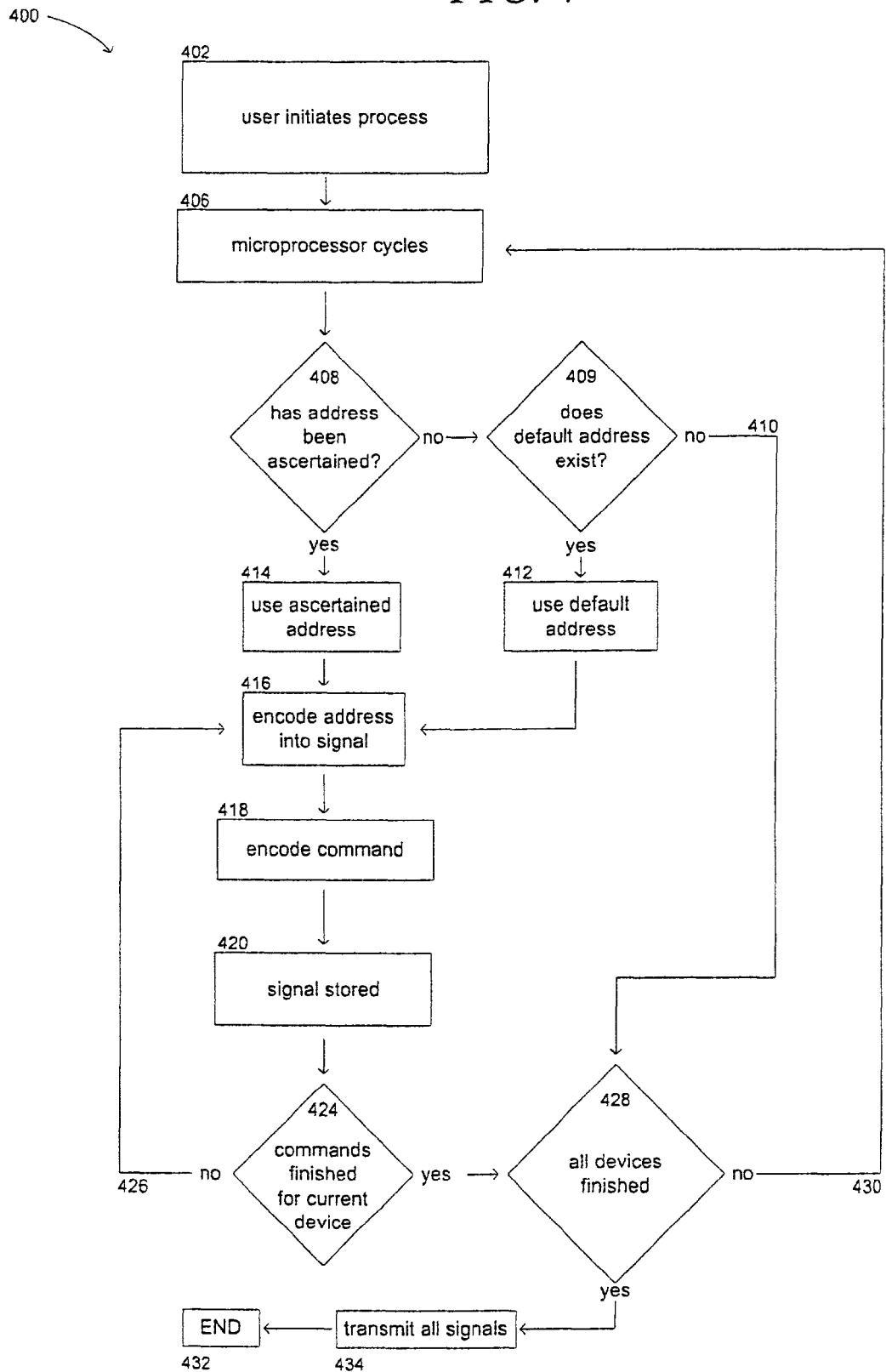
FIG. 4 is a flow chart illustrating the encoding of a signal with an address and a command for an electronic device.

FIG. 4 illustrates a process 400 for automatically sending encoded signals with appropriate addresses and commands to a number of electronic devices. Here, the signals may be transmitted to the different electronic components simultaneously rather than sequentially as in FIG. 3. After each signal is encoded with an address 416 and a command 418, each signal may be stored 420 in a memory device 128 in the remote control 100. When all of the electronic components are cycled through, the microprocessor 124 may transmit 434 all of the signals simultaneously, and then ends the process 432.

Figure 5:
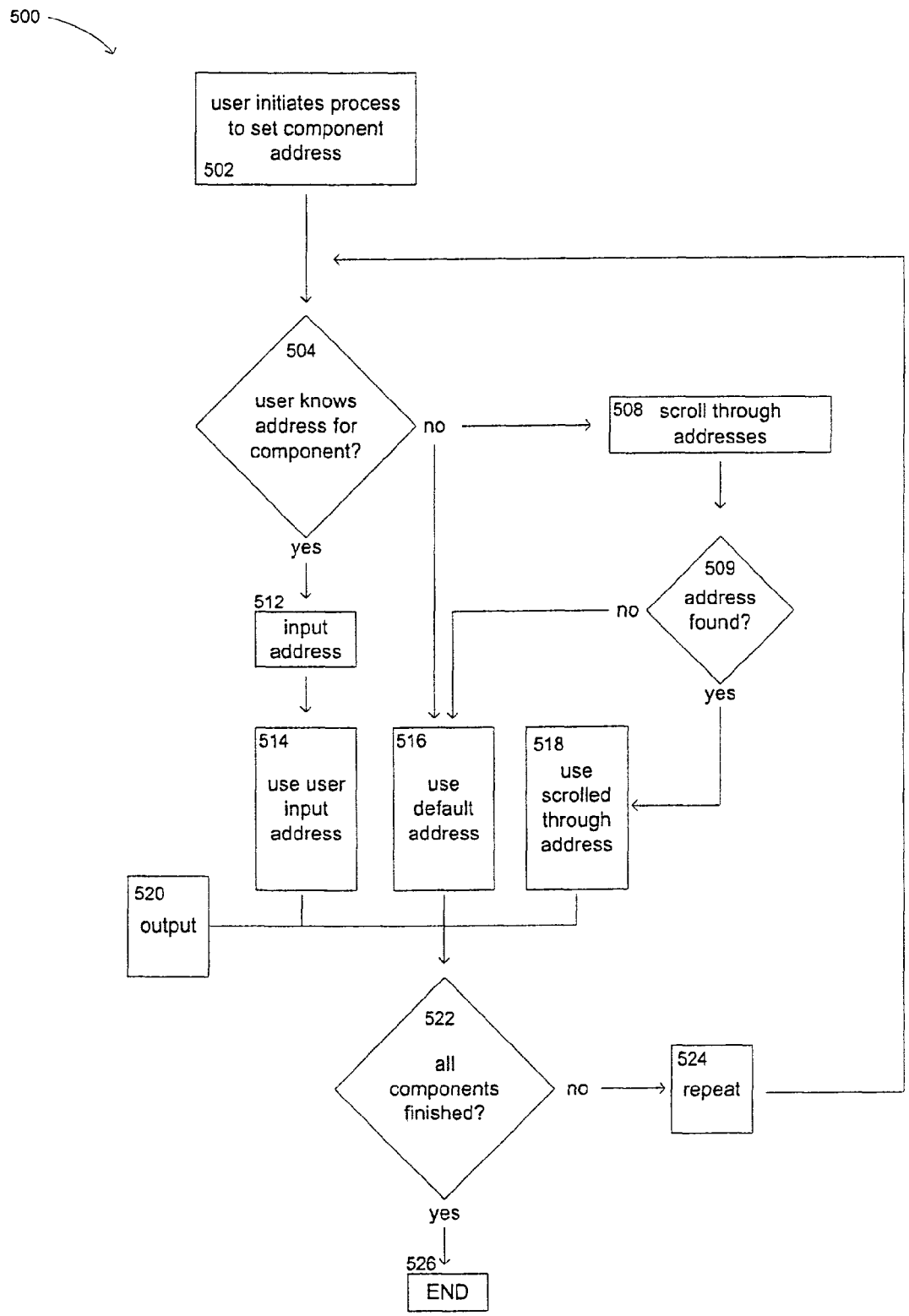
FIG. 5 is a flow chart illustrating ascertaining addresses for a number of electronic devices.

FIG. 5 illustrates a flow chart 500 for ascertaining addresses for particular devices so that the microprocessor 124 may be able to encode the appropriate address into a signal along with a command as described in FIGS. 3 and 4. The remote control 100 may include a memory 128 where the address codes may be stored. The process 500 may begin after a user initiates the process 502 to set an address for a particular device or for multiple devices. Setting an address for a particular device may be accomplished by pressing a button or a combination of buttons on the input device 126. For example, a remote control 100 may include a button with the "DVD" marking that allows a user to dedicate this button to control a DVD player. A user may press the "DVD" button, along with another button, to set the address for the DVD player. A user may press any one button or any combination of buttons on the remote control 100 to set the address of any device. Alternatively, setting addresses for multiple devices may involve automatically cycling through a plurality of devices via a repeat features 522, 524 in the process 500.

The process 500 may begin with a user determining if the address for a particular electronic device is known 504. If the user knows the address, then the user may input 512 the address into the remote control 100. The manufacturer of the electronic device may provide the address corresponding to the device in the documentation provided with the device. Such information may be found in a user manual for example. The user may input the address code through the input device 126 such as a keypad. The microprocessor 124 may then use this user input address and associate it with the particular device 514 in the memory 128.

If the user does not know the address for the device, the user may scroll through a list of addresses 508 or a default address may be used 516. During the scrolling process 508, the remote control may cycle through test signals each encoded with different addresses and the same command, such as a turn "on" command. If the intended device reacts to the test signal by turning "on" then the user may stop scrolling the address because that address may be correct for that particular electronic device. The microprocessor 124 may then use this address and associate it with the particular device 518. If the intended device does not react, then a default address may be used 516.

The output device 129 on the remote control may include a button that illuminates, indicating that an address has been ascertained. During the process 500, information may also be outputted 520 to the user via the output device 129 on the remote control 100. The information may relate to any stage of the process 500. Alternatively, the remote control 100 may "learn" the addresses particular to specific devices by receiving a signal from a device's unique remote control (not shown).

While various embodiments of the invention have been described, it will be apparent to those of ordinary skill in the art that many more embodiments and implementations are possible within the scope of this invention. Accordingly, the invention is not to be restricted except in light of the attached claims and their equivalents.

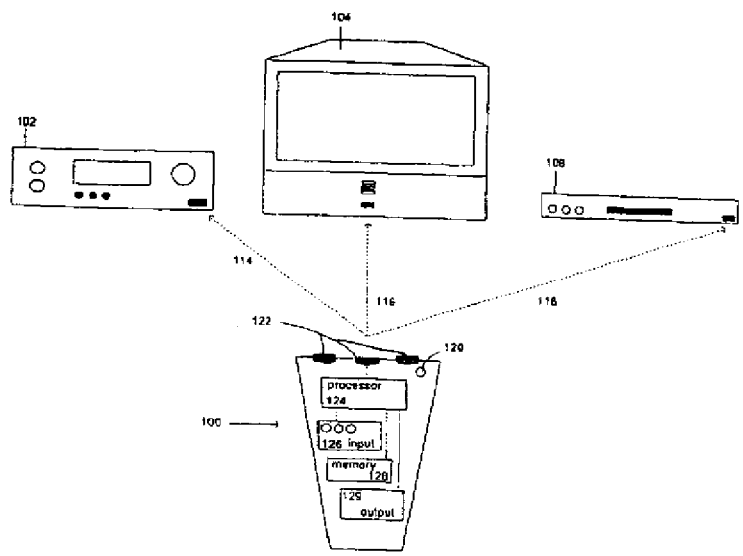

What is claimed is:

1. A remote control, comprising:
   a memory pre-programmed with addresses and commands for a plurality of electronic devices for a home theatre system;
   a processor configured for communicating with the memory to access the addresses and commands for the plurality of electronic devices, and for storing in the memory a plurality of signals encoded with the respective addresses and commands;
   an initiation device capable of communicating with the processor so that when the initiation device is activated the processor encodes an address and a command into a respective one of the signals for each electronic device in the plurality of electronic devices; and
   a plurality of transmitters capable of communicating with the processor where the processor directs the transmitters to simultaneously and automatically send the respective signals to the plurality of electronic devices.

2. The remote control according to claim 1, further including an input device capable of receiving an address and a command for an electronic device from a memory storage area.

3. The remote control according to claim 1, further including an output device capable of communicating with the processor and displaying information about a status of the remote control.

4. The remote control according to claim 1, where the plurality of electronic devices includes a TV.

5. The remote control according to claim 1, where the plurality of electronic devices includes a DVD player.

6. The remote control according to claim 1, where the plurality of electronic devices includes an amplifier.

7. The remote control of claim 1, where the initiation device includes a dedicated button capable of communicating with the processor so that when the dedicated button is activated the processor encodes an address and a turn on or off command into a signal for each respective electronic device.

8. The remote control of claim 1, where the initiation device includes a dedicated on button capable of communicating with the processor so that when the dedicated on button is activated the processor encodes an address and a turn on command into a signal for each respective electronic device, and a dedicated off button capable of communicating with the processor so that when the dedicated off button is activated the processor encodes an address and a turn off command into a signal for each respective electronic device.

9. The remote control of claim 1, where the processor is further configured for:
   cycling through a plurality of addresses in the memory to ascertain an address pre-programmed for a corresponding one of the plurality of electronic devices;

if the ascertained address is found for the corresponding electronic device in the plurality of electronic devices, then encoding the address and a command into a turn on or off signal for the corresponding electronic device; and repeating the cycling and encoding steps for each, of the plurality of electronic devices to encode a plurality of respective turn on or off signals.

10. The remote control of claim 9, where the processor is further configured for:
if the address for electronic device is not available in the memory, then determining if a default address is available for the electronic device;
if a default address is available for the electronic device, then encoding the default address and a command into a signal for the electronic device; and
if a default address is not available for the electronic device, then cycling to a next electronic device in the plurality of electronic devices.

11. A method for controlling electronic devices, comprising:
activating a dedicated button;
cycling through a plurality of addresses in a memory to ascertain an address pre-programmed for a corresponding one of a plurality of electronic devices for a borne theatre system;
if the ascertained address is found for the corresponding electronic device in the plurality of electronic devices, then encoding the address and a command into a turn on or off signal for the corresponding electronic device;
repeating the cycling and encoding steps for each of the plurality of electronic devices to encode a plurality of respective turn on or off signals; and
simultaneously transmitting the respective turn on or off signals to the plurality of electronic devices via a plurality of transmitters.

12. The method according to claim 11, further including:
if the address for electronic device is not available in the memory, then determining if a default address is available for the electronic device;
if a default address is available for the electronic device, then encoding the default address and a command into a signal for the electronic device; and
if a default address is not available for the electronic device, then cycling to a next electronic device in the plurality of electronic devices.

13. A system for controlling a plurality of electronic devices, the system comprising:
a plurality of electronic devices for a home theatre system where each of the plurality of electronic devices is associated with a corresponding one of a plurality of addresses; and
a remote control including:
a memory pre-programmed with respective addresses and commands for the plurality of electronic devices;
a processor configured for communicating with the memory to access the addresses and commands for the plurality of electronic devices, and for storing in the memory a plurality of signals encoded with the respective addresses and commands;
an initiation device capable of communicating with the processor so that when the initiation device is activated the processor encodes an address and a command into a respective one of the signals for each electronic device in the plurality of electronic devices; and
a plurality of transmitters capable of communicating with the processor where the processor directs the transmitters to simultaneously and automatically send the respective signals to the plurality of electronic devices.

14. The system of claim 13, further including an input device capable of receiving an address and a command for an electronic device from a memory storage area.

15. The system of claim 13, further including an output device capable of communicating with the processor and displaying information about a status of the remote control.

16. The system of claim 13, where the initiation device includes a dedicated button capable of communicating with the processor so that when the dedicated button is activated the processor encodes an address and a turn on or off command into a signal for each respective electronic device.

17. The system of claim 13, where the initiation device includes a dedicated on button capable of communicating with the processor so that when the dedicated on button is activated the processor encodes an address and a turn on command into a signal for each respective electronic device, and a dedicated off button capable of communicating with the processor so that when the dedicated off button is activated the processor encodes an address and a turn off command into a signal for each respective electronic device.

18. The system of claim 13, where the processor is further configured for:
cycling through a plurality of addresses in the memory to ascertain an address pre-programmed for a corresponding one of the plurality of electronic devices;
if the ascertained address is found for the corresponding electronic device in the plurality of electronic devices, then encoding the address and a command into a turn on or off signal for the corresponding electronic device; and
repeating the cycling and encoding steps for each of the plurality of electronic devices to encode a plurality of respective turn on or off signals.

19. The system of claim 13, where the processor is further configured for:
if the address for electronic device is not available in the memory, then determining if a default address is available for the electronic device;
if a default address is available for the electronic device, then encoding the default address and a command into a signal for the electronic device; and
if a default address is not available for the electronic device, then cycling to a next electronic device in the plurality of electronic devices.

* * * * *

UNITED STATES PATENT AND TRADEMARK OFFICE
CERTIFICATE OF CORRECTION

PATENT NO. : 7,877,588 B2  
APPLICATION NO. : 10/037208  
DATED : January 25, 2011  
INVENTOR(S) : Ara H. Gharapetian Page 1 of 3

It is certified that error appears in the above-identified patent and that said Letters Patent is hereby corrected as shown below:

The Title Page, showing an illustrative figure, should be deleted and substitute therefor the attached title page.

In the drawings, replace Sheet 1, FIG. 1, with revised Sheet 1, FIG. 1, where the input device depicted in revised Sheet 1, FIG. 1, is designated by reference numeral 120 as opposed to reference numeral 126.

Col. 7, Claim 9, line 5, "each, of the" should be changed to --each of the--

Col. 7, Claim 11, lines 24-5, "borne theatre system" should be changed to --home theatre system--

Signed and Sealed this
Twenty-first Day of February, 2012

David J. Kappos
*Director of the United States Patent and Trademark Office*

(12) United States Patent
Gharapetian

(10) Patent No.: US 7,877,588 B2
(45) Date of Patent: Jan. 25, 2011

(54) SYSTEM FOR TRANSMITTING CONTROL COMMANDS TO ELECTRONIC DEVICES

(75) Inventor: Ara H. Gharapetian, Porter Ranch, CA (US)

(73) Assignee: Harman International Industries, Incorporated, Northridge, CA (US)

( * ) Notice: Subject to any disclaimer, the term of this patent is extended or adjusted under 35 U.S.C. 154(b) by 896 days.

(21) Appl. No.: 10/037,208

(22) Filed: Jan. 4, 2002

(65) Prior Publication Data
US 2002/0101357 A1 Aug. 1, 2002

Related U.S. Application Data

(60) Provisional application No. 60/260,138, filed on Jan. 5, 2001.

(51) Int. Cl.
*G06F 9/24* (2006.01)
*H04B 10/04* (2006.01)

(52) U.S. Cl. .................. 713/1; 713/100; 398/112; 341/174

(58) Field of Classification Search .................. 713/1, 713/100; 341/173, 174, 176; 398/106, 107, 398/111, 112; 348/734
See application file for complete search history.

(56) References Cited

U.S. PATENT DOCUMENTS

| | | | |
|---|---|---|---|
| 4,760,572 A | 7/1988 | Tomikawa | 370/94 |
| 4,850,040 A * | 7/1989 | Teich et al. | 398/112 |
| 5,255,313 A | 10/1993 | Darbee | |
| 5,552,917 A | 9/1996 | Darbee et al. | 359/148 |
| 5,831,663 A | 11/1998 | Waterhouse et al. | 348/8 |
| 5,905,906 A | 5/1999 | Goffinet et al. | 395/828 |
| 6,104,334 A | 8/2000 | Allport | |
| 6,211,870 B1 * | 4/2001 | Foster | 715/744 |
| 6,225,938 B1 * | 5/2001 | Hayes et al. | 341/176 |
| 6,507,306 B1 * | 1/2003 | Griesau et al. | 341/176 |

* cited by examiner

*Primary Examiner*—Thuan N Du

(57) ABSTRACT

This invention provides a remote control capable of automatically sending signals to a variety of electronic devices so that a user does not have to send signals to each of the electronic devices individually. The remote control may include a dedicated button that when activated may send signals to a plurality of electronic devices to perform one or more operations. The remote control may send the signals simultaneously or sequentially. The signals may be also encoded with the specific address for each of the plurality of electronic devices. This way, only the electronic device with the matching address may receive the signal. The signals may be also encoded with any number of commands such as turn "on" or turn "off" so that each electronic device may perform a similar or different operation as other electronic devices. The remote control may be any type of device that may be distinct from the electronic device such as a hand-held device. The electronic devices may be any type of electronic device that may be controlled remotely either through a hardwire or wirelessly.

19 Claims, 5 Drawing Sheets